(12) United States Patent
Martinez et al.

(10) Patent No.: US 11,379,991 B2
(45) Date of Patent: Jul. 5, 2022

(54) UNCERTAINTY-REFINED IMAGE SEGMENTATION UNDER DOMAIN SHIFT

(71) Applicant: National Technology & Engineering Solutions of Sandia, LLC, Albuquerque, NM (US)

(72) Inventors: Carianne Martinez, Albuquerque, NM (US); Kevin Matthew Potter, Albuquerque, NM (US); Emily Donahue, Albuquerque, NM (US); Matthew David Smith, Albuquerque, NM (US); Charles J. Snider, Albuquerque, NM (US); John P. Korbin, Albuquerque, NM (US); Scott Alan Roberts, Albuquerque, NM (US); Lincoln Collins, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 222 days.

(21) Appl. No.: 16/887,311

(22) Filed: May 29, 2020

(65) Prior Publication Data

US 2021/0374968 A1 Dec. 2, 2021

(51) Int. Cl.
*G06T 7/174* (2017.01)
*G06N 3/08* (2006.01)
(Continued)

(52) U.S. Cl.
CPC ............. *G06T 7/174* (2017.01); *G06F 17/18* (2013.01); *G06K 9/628* (2013.01); *G06K 9/6256* (2013.01);
(Continued)

(58) Field of Classification Search
CPC ............ G06T 7/174; G06T 2207/20076; G06T 2207/20081; G06T 2207/20084;
(Continued)

(56) References Cited

U.S. PATENT DOCUMENTS 10,540,578 B2 * 1/2020 Madani ............... G06K 9/6256
10,592,779 B2 * 3/2020 Madani ............... A61B 6/5217
(Continued)

OTHER PUBLICATIONS

Milletari, F. et al., "V-Net: Fully Convolutional Neural Networks for Volumetric Medical Image Segmentation", 2016 Fourth International Conference on 3D Vision (3DV), (arXiv:1606.04797v1), 11 pages.

*Primary Examiner* — Michael S Osinski
(74) *Attorney, Agent, or Firm* — Yee & Associates, P.C.

(57) ABSTRACT

A method for digital image segmentation is provided. The method comprises training a neural network for image segmentation with a labeled training dataset from a first domain, wherein a subset of nodes in the neural net are dropped out during training. The neural network receives image data from a second, different domain. A vector of N values that sum to 1 is calculated for each image element, wherein each value represents an image segmentation class. A label is assigned to each image element according to the class with the highest value in the vector. Multiple inferences are performed with active dropout layers for each image element, and an uncertainty value is generated for each image element. The label of any image element with an uncertainty value above a predefined threshold is replaced with a new label corresponding to the class with the next highest value.

20 Claims, 6 Drawing Sheets

(51) Int. Cl.
  *G06N 5/04* (2006.01)
  *G06K 9/62* (2022.01)
  *G06F 17/18* (2006.01)
(52) U.S. Cl.
  CPC .............. *G06N 3/084* (2013.01); *G06N 5/046* (2013.01); *G06T 2207/20076* (2013.01); *G06T 2207/20081* (2013.01); *G06T 2207/20084* (2013.01)
(58) Field of Classification Search
  CPC ........ G06F 17/18; G06K 9/6256–6259; G06K 9/6268; G06K 9/6257; G06K 9/6262; G06K 9/6267; G06K 9/6272; G06K 9/6281; G06K 9/628; G06K 9/6271; G06N 3/084; G06N 3/0454; G06N 3/08; G06N 3/082; G06N 3/04; G06N 3/0472; G06N 3/0481; G06N 3/088; G06N 3/0427; G06N 5/046; G06V 10/25; G06V 10/454; G06V 10/82
  See application file for complete search history.

(56) References Cited

U.S. PATENT DOCUMENTS

| | | | | |
|---|---|---|---|---|
| 10,833,852 B1 * | 11/2020 | Goodsitt | ................. | H04L 9/085 |
| 10,937,540 B2 * | 3/2021 | Madani | ................ | G06N 3/0454 |
| 11,232,572 B2 * | 1/2022 | Chen | ........................ | G06N 3/08 |
| 2012/0089545 A1 * | 4/2012 | Mei | ..................... | G06K 9/6257 706/20 |
| 2016/0307098 A1 * | 10/2016 | Goel | .................... | G06N 3/0454 |
| 2017/0083752 A1 * | 3/2017 | Saberian | ............. | G06N 3/0454 |
| 2018/0144266 A1 * | 5/2018 | Osogami | ............. | G06N 3/0445 |
| 2018/0314978 A1 * | 11/2018 | Kajino | ................ | G06N 3/0472 |
| 2019/0012582 A1 * | 1/2019 | Aoba | ..................... | G06T 7/136 |
| 2019/0034803 A1 * | 1/2019 | Gotou | .................... | G06N 3/088 |
| 2020/0143240 A1 * | 5/2020 | Baker | ...................... | G06N 3/04 |
| 2020/0151514 A1 * | 5/2020 | Liu | ..................... | G06N 3/0454 |
| 2020/0184337 A1 * | 6/2020 | Baker | ................. | G06N 3/0454 |
| 2020/0250483 A1 * | 8/2020 | Masse | .................... | G06V 10/82 |
| 2020/0250794 A1 * | 8/2020 | Zimmer | ................. | G06T 3/4053 |
| 2020/0257983 A1 * | 8/2020 | Tachibana | .......... | G06K 9/6262 |
| 2020/0275885 A1 * | 9/2020 | Tang | ..................... | G06K 9/628 |
| 2020/0311483 A1 * | 10/2020 | Goto | .................... | G06K 9/6262 |
| 2020/0338454 A1 * | 10/2020 | Kim | ........................ | A63F 13/71 |
| 2020/0372344 A1 * | 11/2020 | Mavroeidis | ........... | G06T 7/0002 |
| 2021/0034985 A1 * | 2/2021 | Vongkulbhisal | ...... | G06F 16/908 |
| 2021/0142152 A1 * | 5/2021 | Burkhart | ............. | G06N 3/0454 |
| 2021/0142908 A1 * | 5/2021 | Lahrmann | ............. | G06V 10/82 |
| 2021/0216825 A1 * | 7/2021 | Sedai | ................... | G06K 9/6259 |
| 2021/0295175 A1 * | 9/2021 | Kennel | ............ | G06F 16/9024 |
| 2021/0357753 A1 * | 11/2021 | Kim | ........................ | G06N 3/04 |
| 2021/0406896 A1 * | 12/2021 | Chaturvedi | .......... | G06K 9/6217 |

\* cited by examiner

UNCERTAINTY-REFINED IMAGE SEGMENTATION UNDER DOMAIN SHIFT

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to image processing, and more specifically to segmentation of image data according to uncertainty resulting from domain shifts.

2. Description of the Related Art

Advances in non-destructive 3D imaging methods have allowed scientists to study previously hidden features of the natural world. X-ray computed tomography (CT), magnetic resonance imaging (MM), and other modern diagnostic methods are capable of generating rich data sets, but these methods produce images plagued by noise and scanning artifacts. While it is possible in most cases for a human to interpret imaging data, these interpretations are often expensive, irreproducible, and unreliable.

Automated image segmentation is critical in many fields such as medicine, manufacturing, and materials science, where interpretation of data must be done quickly and consistently. Existing automated segmentation methods such as deep learning models have achieved high accuracy in many image domains, but often fail to generalize when applied to image data from a shifted domain.

Therefore, it would be desirable to have a method and apparatus that take into account at least some of the issues discussed above, as well as other possible issues.

SUMMARY

An illustrative embodiment provides a computer-implemented method for digital image segmentation. The method comprises training a neural network for image segmentation with a labeled training dataset from a first domain, wherein a subset of nodes in the neural net are dropped out during training. The neural network receives image data from a second, different domain, wherein the image data comprises a number of image elements. The neural network calculates a vector of N values that sum to 1 for each image element, wherein each of the N values represents an image segmentation class. The neural network assigns a segmentation label to each image element, wherein the label corresponds to the segmentation class with the highest value in the vector calculated for the image element. The neural network then uses active dropout layers to perform multiple inferences for each image element and generates an uncertainty value for each image element according to the inferences. The segmentation label of any image element with an uncertainty value above a predefined threshold is replaced with a new segmentation label corresponding to the segmentation class with the next highest value in the vector for that image element.

Another illustrative embodiment provides a system for digital image segmentation. The system comprises a storage device configured to store program instructions, and one or more processors operably connected to the storage device and configured to execute the program instructions to cause the system to: train a neural network for image segmentation with a labeled training dataset from a first domain, wherein a subset of nodes in the neural net are dropped out during training; receive, by the neural network, image data from a second, different domain, wherein the image data comprises a number of image elements; calculate, by the neural network, a vector of N values that sum to 1 for each image element, wherein each of the N values represents an image segmentation class; assign, by the neural network, a segmentation label to each image element, wherein the segmentation label corresponds to a segmentation class with a highest value in the vector calculated for the image element; perform, by the neural network with active dropout layers, multiple inferences for each image element; generate, by the neural network, an uncertainty value for each image element according to the inferences; and replace the segmentation label of any image element with an uncertainty value above a predefined threshold with a new segmentation label corresponding to a segmentation class with a next highest value in the vector for that image element.

Another illustrative embodiment provides a computer program product for digital image segmentation. The computer program product comprises a computer-readable storage medium having program instructions embodied thereon to perform the steps of: training a neural network for image segmentation with a labeled training dataset from a first domain, wherein a subset of nodes in the neural net are dropped out during training; receiving, by the neural network, image data from a second, different domain, wherein the image data comprises a number of image elements; calculating, by the neural network, a vector of N values that sum to 1 for each image element, wherein each of the N values represents an image segmentation class; assigning, by the neural network, a segmentation label to each image element, wherein the segmentation label corresponds to a segmentation class with a highest value in the vector calculated for the image element; performing, by the neural network with active dropout layers, multiple inferences for each image element; generating, by the neural network, an uncertainty value for each image element according to the inferences; and replacing the segmentation label of any image element with an uncertainty value above a predefined threshold with a new segmentation label corresponding to a segmentation class with a next highest value in the vector for that image element.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that advances in non-destructive 3D imaging methods have allowed scientists to study previously hidden features of the natural world, and while it is possible in most cases for a human to interpret imaging data, these interpretations are often expensive, irreproducible, and unreliable.

The illustrative embodiments also recognize and take into account that automated image segmentation is critical in many fields. Deep learning segmentation models are known to be sensitive to the scale, contrast, and distribution of pixel values when applied to Computed Tomography (CT) images. For material samples, scans are often obtained from a variety of scanning equipment and resolutions resulting in domain shift. However, existing automated segmentation methods such as deep learning models often fail to generalize when applied to image data from a shifted domain due to overfitting of the models during training.

The task of semantic segmentation has seen significant improvement after the publication of the Fully Convolutional Network and the encoder-decoder networks that followed. One such architecture, the U-net, employed an encoder, decoder, and skip connections to achieve state of the art results on 2D biomedical segmentation. The V-net extended these results to 3D volumes with similar success. The illustrative embodiments enhance the V-net architecture with dropout layers for uncertainty quantification (UQ).

While semantic segmentation models have seen further innovation, few generalize well if there is a domain gap between the training and testing images. This problem, known as domain shift, has been tackled with adversarial learning, co-training, or domain statistic alignment approaches. Most solutions to the problem approach the problem at the pixel, or feature space level. The method of the illustrative embodiments is performed in output space, after inference has occurred. However, rather than using a separate deep learning model to modify the outputs, the illustrative embodiments leverage the uncertainty in the model's predictions quantified by using dropout at inference time.

Figure 1:
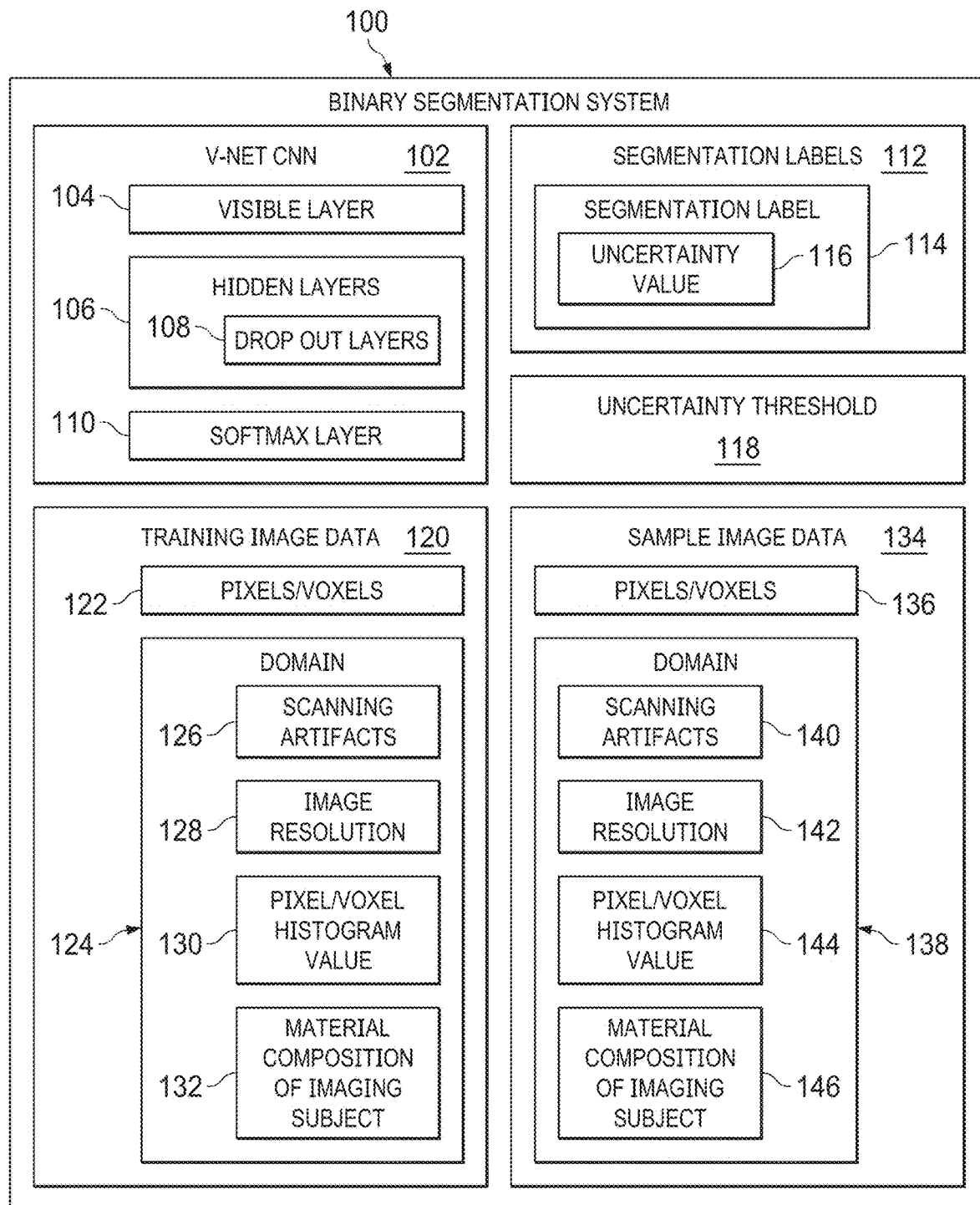
FIG. 1 depicts a block diagram of a binary segmentation system in accordance with illustrative embodiments.

FIG. 1 depicts a block diagram of binary segmentation system in accordance with illustrative embodiments. Binary segmentation system 100 comprises V-net convolutional neural network (CNN) 102, which is used to process and interpret volumetric image data. V-net CNN 102 comprises a number of layers of nodes (aka neurons, units), including a visible layer 104, hidden layers 106, and softmax layer 110. Hidden layers 106 include drop-out 108, which comprise select nodes that are ignored during training and subsequent use of V-net CNN 102 to prevent it from overfitting particular datasets (explained in more detail below).

V-net CNN 102 can be trained initially with training image data 120, which comprises a number of pixels (2D) or voxels (3D) 122 representing an image. Training image data 120 is also defined by domain 124, which is specific to the scanning equipment (e.g., CT scanner) and settings used to collect training image data 120, as well as variances in the material composition of the individual imaging subject (i.e. the object being scanned). Domain 124 comprises factors that influence the quality of image training data 120 included, e.g., scanning artifacts 126 produced by the specific scanning equipment, image resolution 128, pixel/voxel histogram values 130, and the material composition of the imaging subject 132.

After V-net CNN 102 is trained using training image data 120, it can be used to interpret new sample image data 134 produced by another imaging source. Like training image data 120, sample image data 134 also comprises pixels/voxels 136 and is defined by its own domain 138. Domain 138 of sample image data 134 might comprise scanning artifacts 140, image resolution 142, pixel/voxel histogram values 144, or material properties of the imaging subject 146 that differ from those of domain 124 of the training image data 120 due to different scanning equipment used to collect the respective images and the object scanned. This difference between domains 124 and 138 is known as domain shift. Drop-out layers 108, when applied at inference time, allow V-net CNN 102 to generate an uncertainty value 116 for each pixel/voxel that is used to compensate for the domain shift between training image data 120 and sample image data 134.

When V-net CNN 102 processes sample image data 134, it produces image segmentation labels 112 for each of pixels/voxels 136. Segmentation labels 112 indicate an image segmentation class represented by a particular pixel/voxel. Each segmentation label 114 has an uncertainty value 116, which is compared to a predefined uncertainty threshold 118. If the uncertainty value 116 of a segmentation label 114 exceeds the uncertainty threshold 118, the label is changed to another segmentation label with a next highest valued (explained below).

Figure 2:
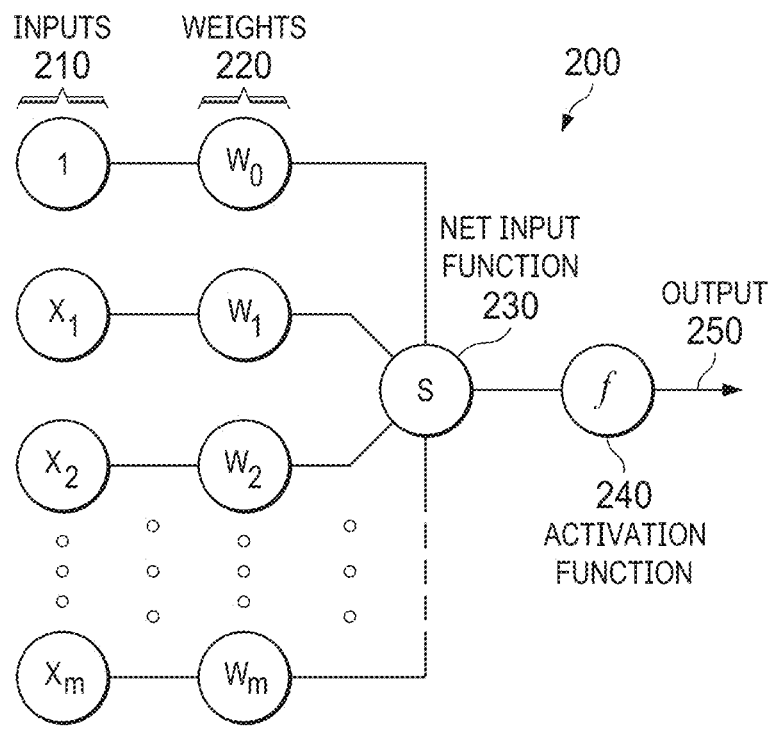
FIG. 2 is a diagram that illustrates a node in a neural network in which illustrative embodiments can be implemented.

FIG. 2 is a diagram that illustrates a node in a neural network in which illustrative embodiments can be implemented. Node 200 combines multiple inputs 210 from other nodes. Each input 210 is multiplied by a respective weight 220 that either amplifies or dampens that input, thereby assigning significance to each input for the task the algorithm is trying to learn. The weighted inputs are collected by a net input function 230 and then passed through an activation function 240 to determine the output 250. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 3:
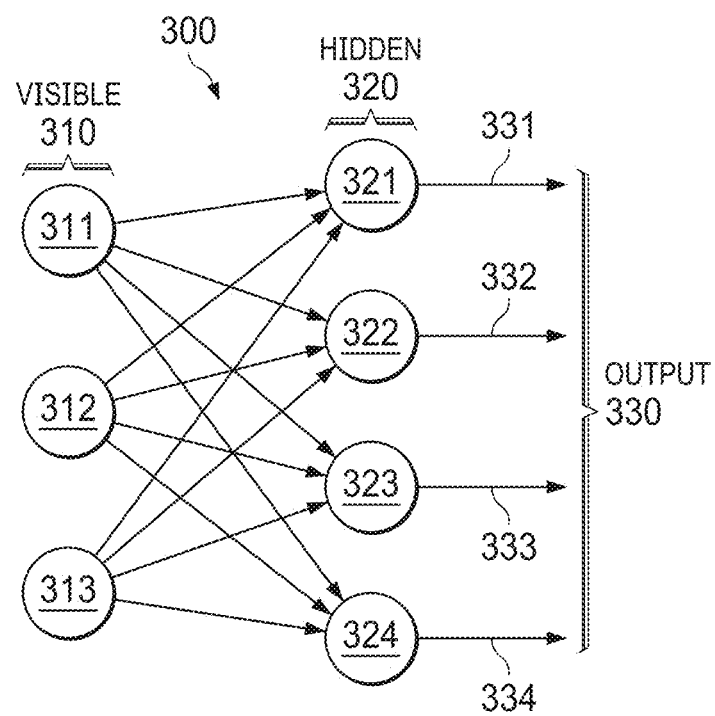
FIG. 3 is a diagram illustrating a neural network in which illustrative embodiments can be implemented.

FIG. 3 is a diagram illustrating a neural network in which illustrative embodiments can be implemented. As shown in FIG. 3, the nodes in the neural network 300 are divided into a layer of visible nodes 310 and a layer of hidden nodes 320. The visible nodes 310 are those that receive information from the environment (i.e. a set of external training data). Each visible node in layer 310 takes a low-level feature from an item in the dataset and passes it to the hidden nodes in the next layer 320. When a node in the hidden layer 320 receives an input value x from a visible node in layer 310 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 321 receives input from all of the visible nodes 311-313 each x value from the separate nodes is multiplied by its respective weight, and all of the products are summed. The summed products are then added to the hidden layer bias, and the result is passed through the activation function to produce output 331. A similar process is repeated at hidden nodes 322-324 to produce respective outputs 332-334. In the case of a deeper neural network, the outputs 330 of hidden layer 320 serve as inputs to the next hidden layer.

Training a neural network occurs in a supervised fashion with training data comprised of a set of input-output pairs, (x,y), where x is an input example and y is the desired output of the neural network corresponding to x. Training typically proceeds as follows. Each x in the training data set is input to the neural network (visible layer 310), and the neural network processes the input through the hidden layer 320 and produces an output, y' 330. This predicted output, y', is compared to the desired output y corresponding to input x from the training data set, and the error between y' and y is calculated. Using a calculus-based method known as backpropagation, the amount of each node's contribution to the prediction error is calculated, and each node's weight is adjusted to improve the neural network's prediction. Several training iterations are typically used to train the neural network to a desired level of accuracy with respect to the training data.

In machine learning, the aforementioned error is calculated via a cost function that estimates how the model is performing. It is a measure of how wrong the model is in terms of its ability to estimate the relationship between input x and output y, which is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural network layers can be stacked to create deep networks. After training one neural net, the activities of its hidden nodes can be used as inputs for a higher level, thereby allowing stacking of neural network layers. Such stacking makes it possible to efficiently train several layers of hidden nodes. Examples of stacked networks include deep belief networks (DBN), deep Boltzmann machines (DBM), recurrent neural networks (RNN), and convolutional neural networks (CNN).

Figure 4:
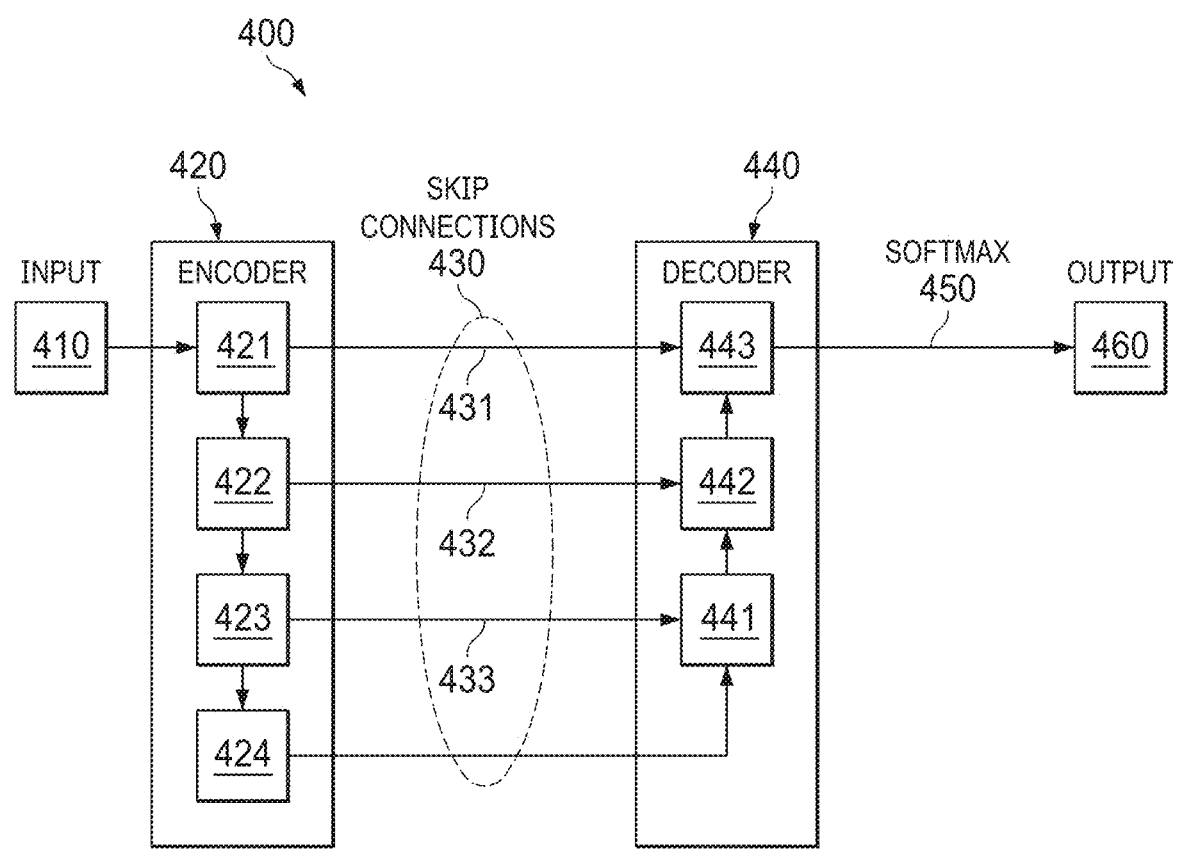
FIG. 4 is a diagram illustrating a V-net convolutional neural network in which illustrative embodiments can be implemented.

FIG. 4 is a diagram illustrating a V-net convolutional neural network (CNN) in which illustrative embodiments can be implemented. The V-Net architecture 400 consists of an input layer 410, encoder 420, skip connections 430, decoder 440, a softmax layer 450, and an output layer 460. The input 410 consists of pixels/voxels representing an image. The pixels/voxels are encoded into a lower dimensional representation by several successive layers 421-424 comprising encoder 420.

The pixels/voxels are then decoded by successive layers 441-443 comprising the decoder 440. Each decoding layer uses as its input the previous decoding layer's output as well as a respective encoder layer's output. The respective inputs from encoding layers 421-424 to decoding layers 441-443 are shown as skip connections 431-433. For example, the input to decoding layer 442 comprises the output from decoding layer 441 and the output from encoding layer 422 via skip connection 432.

The decoder 440 is followed by a softmax layer 450 that produces the final output 460 comprising a vector of N values that sum to 1 for each voxel.

With the goal of automatically segmenting a diverse set of images across domain shifts, the illustrative embodiments train a CNN using a labeled training set. To quantify the model's uncertainty on a per pixel/voxel basis, the illustrative embodiments employ a dropout technique both during training and inference. When inferring on examples from a domain that is shifted from the training example in resolution, pixel/voxel histogram value, or in scan artifacts tied to a specific machine, inference is run multiple times with active dropout layers to generate an uncertainty map for each pixel/voxel. The value of the uncertainty at each pixel/voxel location is calculated as the standard deviation in the values from the final softmax layer of the CNN over multiple inference runs.

The CNN segmentations of domain-shifted CT scans consistently predict more material than is present in the images. However, uncertainty in the regions of the model's false positive material classification is higher than in the regions where the segmentation appears to be accurate. (See FIG. 6B). The illustrative embodiments take advantage of this uncertainty bias and change segmentation labels for any pixels/voxels in regions of relatively high uncertainty. To automate this refinement process in the binary case, for example, an uncertainty value threshold informs the modification of segmentation labels by optimizing Equation 1 for the best threshold t:

$$\max_t |V_1(t) - V_0(t)| \qquad \text{Eq. (1)}$$

where $V_1(t) = \{v_k \mid l_k = 1 \wedge u_k \leq t\}$, $V_0(t) = \{v_k \mid l_k = 0 \vee u_k > t\}$, $v_k$ is the intensity of voxel k with CNN label $l_k$ and uncertainty value $u_k$, and t is the uncertainty value threshold. Intuitively, $\overline{V_i(t)}$ is the average value of pixels/voxels labeled i after refining segmentation with uncertainty threshold t. By maximizing Equation 1, the illustrative embodiments creating the largest separation between the modes of pixel/voxel intensity.

Figure 5:
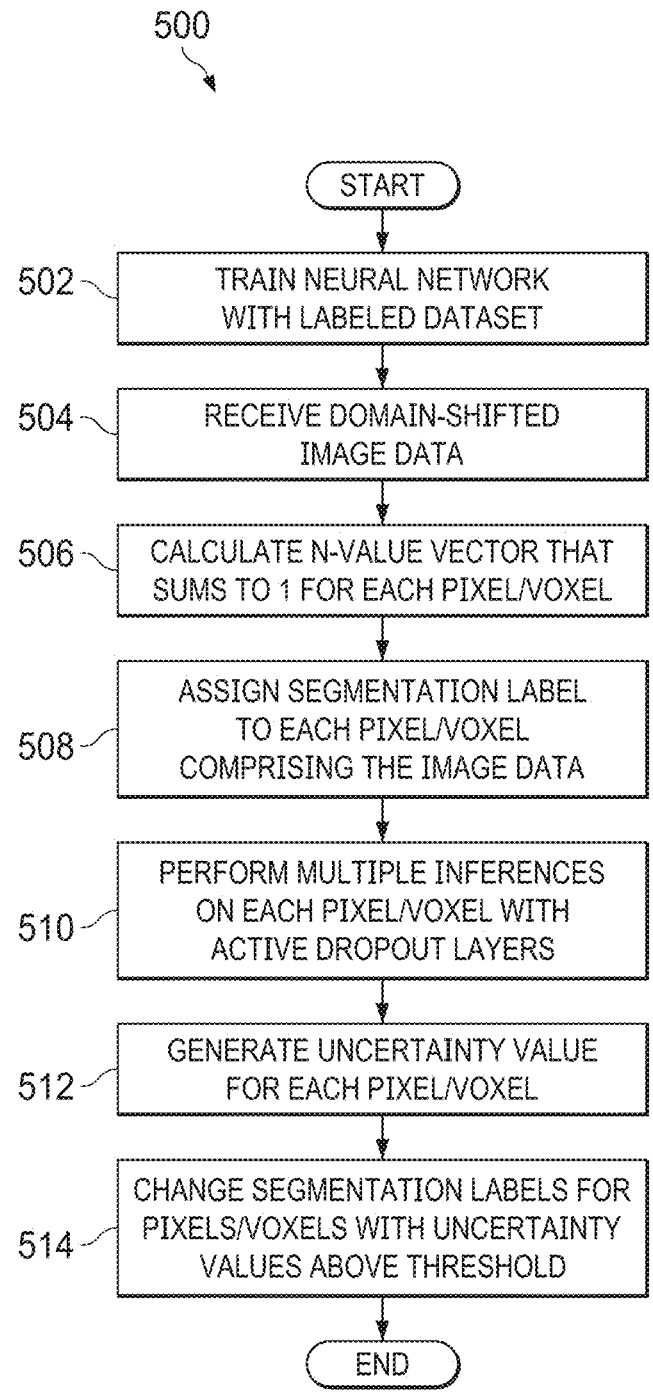
FIG. 5 depicts a flowchart illustrating a process of image segmentation in accordance with an illustrative embodiment.

FIG. 5 depicts a flowchart illustrating a process of image segmentation in accordance with an illustrative embodiment. Process 500 might be implemented with binary segmentation system 100 in FIG. 1 and V-net CNN 400 in FIG. 4.

Process 500 begins by training a neural network for image segmentation with a labeled training dataset from a first domain, wherein a subset of nodes in the neural net are dropped out during training (step 502). The neural network might be a three-dimensional V-net CNN such as CNN 400 in FIG. 4.

The neural network receives image data from a second, different domain, wherein the image data comprises a number of image elements (step 504). The image elements might comprise two-dimensional pixels or three-dimensional voxels. The image data might comprise a computed tomography image. The domain shift between the domain of the training dataset and the domain of the image data might result from, e.g., differences in image scanning equipment, pixel/voxel histogram value, material composition of the imaging subject, and/or image resolution.

The neural network then calculates a vector of N values that sum to 1 for each image element, wherein each of the N values represents an image segmentation class (step 506). Segmentation classes are defined by the specific imaging task. For example, for tumor identification in a CT scan, the segmentation classes might represent a simple binary choice of no tumor present (class 0) or tumor present (class 1). A different medical application might segment a CT image according to organ type, e.g., heart (class 0), lungs (class 1), liver (class 2), etc. As another example, in the field of autonomous-driving vehicles, the image might be segmented into classes such as, e.g., road (class 0), pedestrian (class 1), stop sign (class 2), lane lines (class 3), other vehicles (class 4), sidewalks (class 5), etc. N is the total number of different segment classes predefined for the imaging task in question.

For each pixel/voxel in the image, the neural network calculates a value between 0 and 1 for each predefined class that predicts the likelihood the pixel/voxel in question represents that class. All N values in the vector sum to 1. Using the example of a three-class segmentation the neural network might output values of 0.1 (class 0), 0.5 (class 1), and 0.4 (class 2) for a particular pixel/voxel.

The neural network assigns a segmentation label to each image element, wherein the segmentation label corresponds to the segmentation class with the highest value in the vector calculated for the image element (step 508). Continuing the example above, since class 1 had the highest value (0.5), the pixel/voxel would be labeled class 1.

The neural network then uses active dropout layers to perform multiple inferences for each image element, wherein different nodes are dropped out for each inference (step 510). The active dropout layers introduce variance in the output of the inferences. In an embodiment, a standard deviation is taken over the inference values for each pixel/voxel generated by the final softmax layer of the neural network. The specific number of inferences performed is dependent upon the underlying distribution of values that the neural network generates for each pixel/voxel. Therefore, the number of inferences might range from two to 1000+.

The neural network then generates an uncertainty value for each image element according to the inferences (step 512). The uncertainty value represents a confidence level for the neural network's prediction that the pixel/voxel in question does in fact fall into the class for which it has been labeled.

The segmentation label of any image element with an uncertainty value above a predefined threshold is replaced with a new segmentation label corresponding to the segmentation class with the next highest value in the vector for that image element (step 514). Continuing the example above, the pixel/voxel originally labeled class 1 (value 0.5) might have an uncertainty level above the threshold. Therefore, the neural network would change the segmentation label to class 2, which had the second highest output value (0.4). Changing the segmentation labels of pixels/voxels with uncertainty values above the threshold produces the largest separation between average intensity of pixels/voxels in different segmentation classes.

Figure 6A:
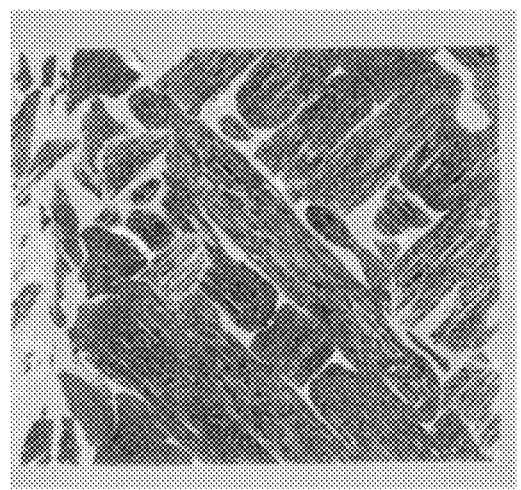
FIG. 6A depicts a slice of a CT scan to be segmented.
Figure 6B:
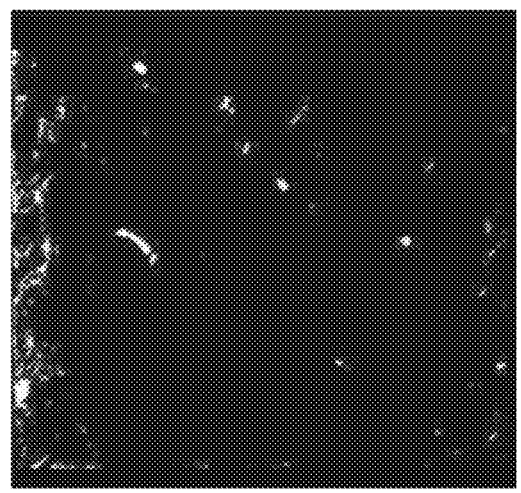
FIG. 6B illustrates predicted binary labels for the CT slice in FIG. 6A from a CNN without uncertainty-guided refinement.
Figure 6C:
FIG. 6C illustrates resulting binary labels after applying uncertainty-guided refinement in accordance with an illustrative embodiment.

FIGS. 6A-6C illustrate results from applying the method of the illustrative embodiments to CT scans of woven composite materials with material composition, resolution, and greyscale histogram different from the training set. FIG. 6A depicts a slice of a CT scan to be segmented. FIG. 6B illustrates predicted binary labels for the CT slice in FIG. 6A from a CNN without uncertainty-guided refinement. FIG. 6C illustrates resulting binary labels after applying uncertainty-guided refinement in accordance with an illustrative embodiment.

Figure 7:
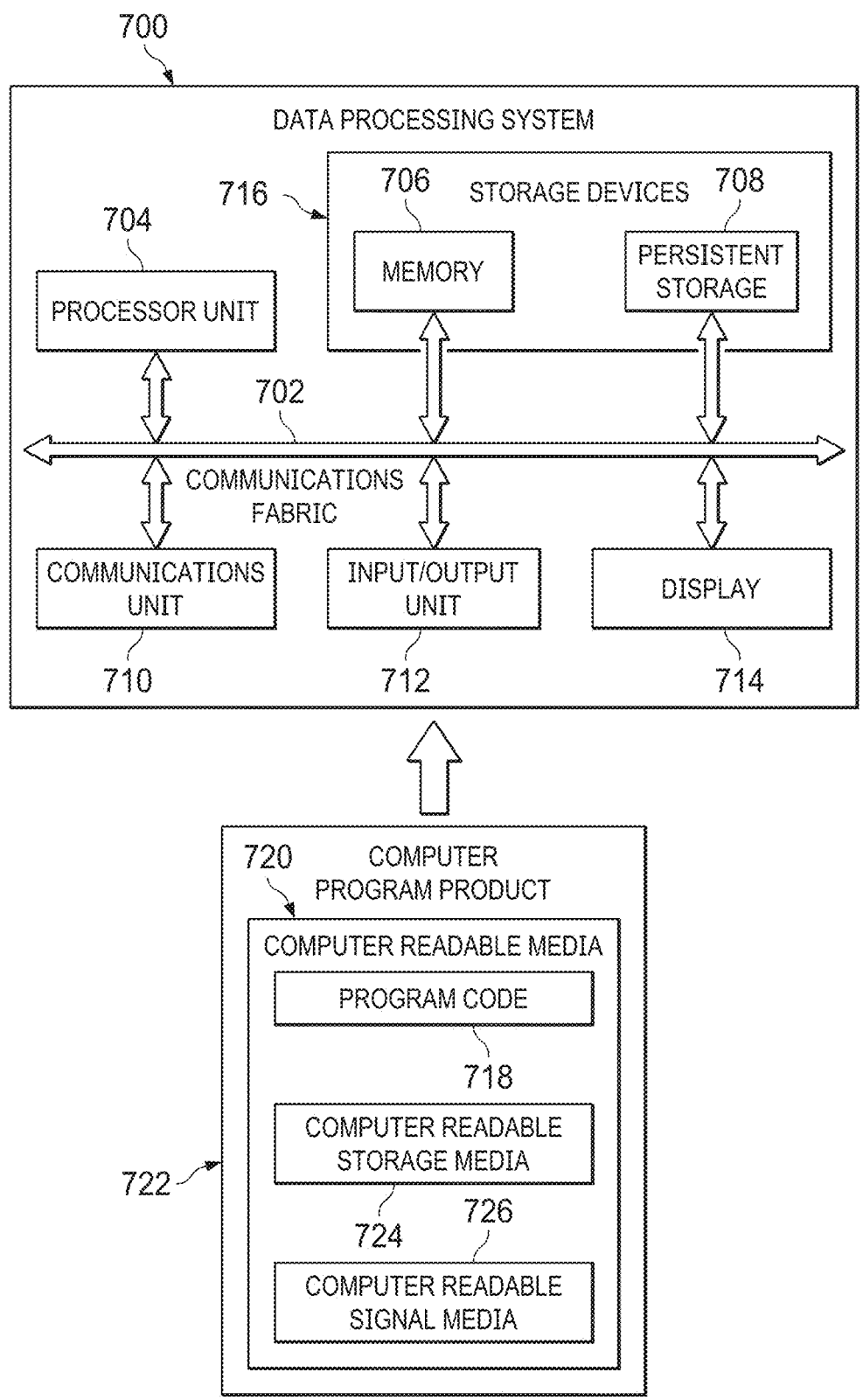
FIG. 7 is a diagram of a data processing system depicted in accordance with an illustrative embodiment.

Turning to FIG. 7, a diagram of a data processing system is depicted in accordance with an illustrative embodiment. Data processing system 700 is an example of a system in which computer-readable program code or program instructions implementing processes of illustrative embodiments may be run. Data processing system 700 may be used to implement binary segmentation system 100 in FIG. 1. In this illustrative example, data processing system 700 includes communications fabric 702, which provides communications between processor unit 704, memory 706, persistent storage 708, communications unit 710, input/output unit 712, and display 714.

Processor unit 704 serves to execute instructions for software applications and programs that may be loaded into memory 706. Processor unit 704 may be a set of one or more hardware processor devices or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 706, in these examples, may be, for example, a random access memory, or any other suitable volatile or non-volatile storage device. Persistent storage 708 may take various forms, depending on the particular implementation. For example, persistent storage 708 may contain one or more devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in this example, provides for communication with other computers, data processing systems, and devices via network communications unit 710 may provide communications using both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 700.

Input/output unit 712 allows for the input and output of data with other devices that may be connected to data processing system 700. For example, input/output unit 712 may provide a connection for user input through a keypad, keyboard, and/or some other suitable input device. Display 714 provides a mechanism to display information to a user and may include touch screen capabilities to allow the user to make on-screen selections through user interfaces or input data, for example.

Instructions for the operating system, applications, and/or programs may be located in storage devices 716, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented program instructions, which may be located in a memory, such as memory 706. These program instructions are referred to as program code, computer-usable program code, or computer-readable program code that may be read and run by a processor in processor unit 704. The program code, in the different embodiments, may be embodied on different physical computer-readable storage devices, such as memory 706 or persistent storage 708.

Program code 718 is located in a functional form on computer-readable media 720 that is selectively removable and may be loaded onto or transferred to data processing system 700 for running by processor unit 704. Program code 718 and computer-readable media 720 form computer program product 722. In one example, computer-readable media 720 may be computer-readable storage media 724 or computer-readable signal media 726. Computer-readable storage media 724 may include, for example, an optical or magnetic disc that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory that is connected to data processing system 700. In some instances, computer-readable storage media 724 may not be removable from data processing system 700.

Alternatively, program code 718 may be transferred to data processing system 700 using computer-readable signal media 726. Computer-readable signal media 726 may be, for example, a propagated data signal containing program code 718. For example, computer-readable signal media 726 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 718 may be downloaded over a network to persistent storage 708 from another device or data processing system through computer-readable signal media 726 for use within data processing system 700. For instance, program code stored in a computer-readable storage media in a data processing system may be downloaded over a network from the data processing system to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to, or in place of, those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a computer-readable storage device in data processing system 700 is any hardware apparatus that may store data. Memory 706, persistent storage 708, and computer-readable storage media 724 are examples of physical storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for digital image segmentation, the method comprising:
   using a number of processors to perform the steps of:
      training a neural network for image segmentation with a labeled training dataset from a first domain, wherein a subset of nodes in the neural net are dropped out during training;
      receiving, by the neural network, image data from a second, different domain, wherein the image data comprises a number of image elements;
      calculating, by the neural network, a vector of N values that sum to 1 for each image element, wherein each of the N values represents an image segmentation class;
      assigning, by the neural network, a segmentation label to each image element, wherein the segmentation label corresponds to a segmentation class with a highest value in the vector calculated for the image element;
      performing, by the neural network with active dropout layers, multiple inferences for each image element;
      generating, by the neural network, an uncertainty value for each image element according to the inferences; and replacing the segmentation label of any image element with an uncertainty value above a predefined threshold with a new segmentation label corresponding to a segmentation class with a next highest value in the vector for that image element.

2. The method of claim 1, wherein the neural network is a three-dimensional V-net convolutional neural network.

3. The method of claim 1, wherein the image elements comprise pixels.

4. The method of claim 1, wherein the image elements comprise voxels.

5. The method of claim 1, wherein generating the uncertainty value for each image element further comprises taking a standard deviation over inference values for each image element.

6. The method of claim 1, wherein different domains result from differences in at least one of:
  image scanning equipment;
  image element histogram value;
  material composition of the imaging subject; or
  image resolution.

7. The method of claim 1, wherein replacing the segmentation labels of image elements with uncertainty values above the threshold produces a largest separation between average intensity of image elements in different segmentation classes.

8. A system for digital image segmentation, the system comprising:
  a storage device configured to store program instructions; and
  one or more processors operably connected to the storage device and configured to execute the program instructions to cause the system to:
    train a neural network for image segmentation with a labeled training dataset from a first domain, wherein a subset of nodes in the neural net are dropped out during training;
    receive, by the neural network, image data from a second, different domain, wherein the image data comprises a number of image elements;
    calculate, by the neural network, a vector of N values that sum to 1 for each image element, wherein each of the N values represents an image segmentation class;
    assign, by the neural network, a segmentation label to each image element, wherein the segmentation label corresponds to a segmentation class with a highest value in the vector calculated for the image element;
    perform, by the neural network with active dropout layers, multiple inferences for each image element;
    generate, by the neural network, an uncertainty value for each image element according to the inferences; and
    replace the segmentation label of any image element with an uncertainty value above a predefined threshold with a new segmentation label corresponding to a segmentation class with a next highest value in the vector for that image element.

9. The system of claim 8, wherein the neural network is a three-dimensional V-net convolutional neural network.

10. The system of claim 8, wherein the image elements comprise pixels.

11. The system of claim 8, wherein the image elements comprise voxels.

12. The system of claim 8, wherein generating the uncertainty value for each image element further comprises taking a standard deviation over inference values for each image element.

13. The system of claim 8, wherein different domains result from differences in at least one of:
  image scanning equipment;
  image element histogram value;
  material composition of the imaging subject; or
  image resolution.

14. The system of claim 8, wherein replacing the segmentation labels of image elements with uncertainty values above the threshold produces a largest separation between average intensity of image elements in different segmentation classes.

15. A computer program product for digital image segmentation, the computer program product comprising:
  a non-transitory computer-readable storage medium having program instructions embodied thereon to perform the steps of:
    training a neural network for image segmentation with a labeled training dataset from a first domain, wherein a subset of nodes in the neural net are dropped out during training;
    receiving, by the neural network, image data from a second, different domain, wherein the image data comprises a number of image elements;
    calculating, by the neural network, a vector of N values that sum to 1 for each image element, wherein each of the N values represents an image segmentation class;
    assigning, by the neural network, a segmentation label to each image element, wherein the segmentation label corresponds to a segmentation class with a highest value in the vector calculated for the image element;
    performing, by the neural network with active dropout layers, multiple inferences for each image element;
    generating, by the neural network, an uncertainty value for each image element according to the inferences; and
    replacing the segmentation label of any image element with an uncertainty value above a predefined threshold with a new segmentation label corresponding to a segmentation class with a next highest value in the vector for that image element.

16. The computer program product of claim 15, wherein the neural network is a three-dimensional V-net convolutional neural network.

17. The computer program product of claim 15, wherein the image elements comprise pixels.

18. The computer program product of claim 15, wherein the image elements comprise voxels.

19. The computer program product of claim 15, wherein generating the uncertainty value for each image element further comprises taking a standard deviation over inference values for each image element.

20. The computer program product of claim 15, wherein different domains result from differences in at least one of:
  image scanning equipment;
  image element histogram value;
  material composition of the imaging subject; or
  image resolution.

* * * * *